United States Patent
Ashikhmin

(10) Patent No.: US 8,411,777 B2
(45) Date of Patent: Apr. 2, 2013

(54) COMPLEX VECTOR QUANTIZATION CODEBOOK FOR USE IN DOWNLINK MULTI-USER MIMO MOBILE BROADCAST SYSTEMS

(75) Inventor: Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1673 days.

(21) Appl. No.: 11/821,356

(22) Filed: Jun. 22, 2007

(65) Prior Publication Data

US 2008/0316910 A1    Dec. 25, 2008

(51) Int. Cl.
*H04B 7/02* (2006.01)

(52) U.S. Cl. ........ 375/267; 375/261; 375/260; 375/347; 375/349; 375/350; 375/144; 375/148; 375/E1.02; 370/208; 455/303; 455/134; 455/135

(58) Field of Classification Search .................. 375/281, 375/267, 261, 260, 347, 349, 350, 144, 148, 375/E1.02, 1.036; 455/303, 134, 135, 63; 370/308

See application file for complete search history.

(56) References Cited

U.S. PATENT DOCUMENTS

| | | | | |
|---|---|---|---|---|
| 5,649,030 A | * | 7/1997 | Normile et al. | 382/253 |
| 7,934,137 B2 | * | 4/2011 | Luo et al. | 714/751 |
| 2006/0039493 A1 | * | 2/2006 | Mukkavilli et al. | 375/267 |
| 2008/0101321 A1 | * | 5/2008 | Cheng et al. | 370/342 |

OTHER PUBLICATIONS

Borges et al., "quaternary Reed-Muller codes", Jul. 2005, IEEE transactions on information theory, vol. 51. No. 7, pp. 2686-2691.*

* cited by examiner

*Primary Examiner* — Daniel Washburn
*Assistant Examiner* — Rahel Guarino
(74) *Attorney, Agent, or Firm* — M. I. Finston

(57) ABSTRACT

A wireless communications device having a complex vector quantization codebook for use in a downlink multi-user MIMO (multiple-input-multiple-output) mobile broadcast system with feedback enables the interference between data simultaneously sent by the base station to a plurality of mobile terminals to be reliably minimized. The codebook contains many subsets of code vectors that are substantially mutually (i.e., pairwise) orthogonal, or almost orthogonal, to each other. With use of such a codebook, a base station can transmit simultaneously to subsets of mobile terminals associated with these subsets of code vectors with minimal interference therebetween.

20 Claims, 3 Drawing Sheets

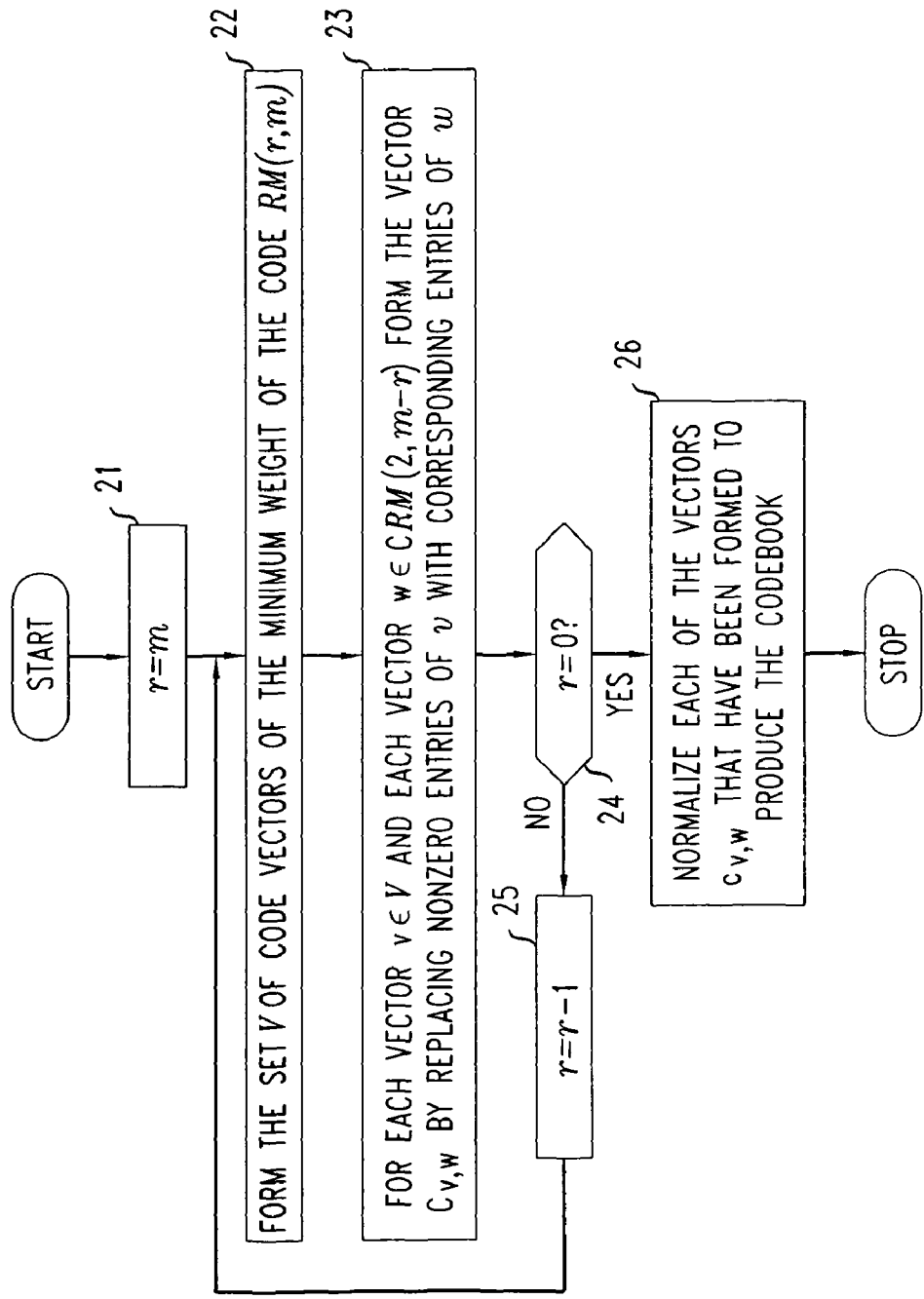

FIG. 3

$c_1 = (1, 0, 0, 0)$, $c_2 = (0, 1, 0, 0)$, $c_3 = (0, 0, 1, 0)$, $c_4 = (0, 0, 0, 1)$
$c_5 = 1/\sqrt{2}(1, 1, 0, 0)$, $c_6 = 1/\sqrt{2}(1, i, 0, 0)$, $c_7 = 1/\sqrt{2}(1, -1, 0, 0)$, $c_8 = 1/\sqrt{2}(1, -i, 0, 0)$
$c_9 = 1/\sqrt{2}(1, 0, 1, 0)$, $c_{10} = 1/\sqrt{2}(1, 0, i, 0)$, $c_{11} = 1/\sqrt{2}(1, 0, -1, 0)$, $c_{12} = 1/\sqrt{2}(1, 0, -i, 0)$
$c_{13} = 1/\sqrt{2}(1, 0, 0, 1)$, $c_{14} = 1/\sqrt{2}(1, 0, 0, i)$, $c_{15} = 1/\sqrt{2}(1, 0, 0, -1)$, $c_{16} = 1/\sqrt{2}(1, 0, 0, -i)$
$c_{17} = 1/\sqrt{2}(0, 1, 1, 0)$, $c_{18} = 1/\sqrt{2}(0, 1, i, 0)$, $c_{19} = 1/\sqrt{2}(0, 1, -1, 0)$, $c_{20} = 1/\sqrt{2}(0, 1, -i, 0)$
$c_{21} = 1/\sqrt{2}(0, 1, 0, 1)$, $c_{22} = 1/\sqrt{2}(0, 1, 0, i)$, $c_{23} = 1/\sqrt{2}(0, 1, 0, -1)$, $c_{24} = 1/\sqrt{2}(0, 1, 0, -i)$
$c_{25} = 1/\sqrt{2}(0, 0, 1, 1)$, $c_{26} = 1/\sqrt{2}(0, 0, 1, i)$, $c_{27} = 1/\sqrt{2}(0, 0, 1, -1)$, $c_{28} = 1/\sqrt{2}(0, 0, 1, -i)$
$c_{29} = 1/2(1, 1, 1, 1)$, $c_{30} = 1/2(1, -1, 1, -1)$, $c_{31} = 1/2(1, 1, -1, -1)$, $c_{32} = 1/2(1, -1, -1, 1)$
$c_{33} = 1/2(1, 1, -i, -i)$, $c_{34} = 1/2(1, -1, -i, i)$, $c_{35} = 1/2(1, 1, i, i)$, $c_{36} = 1/2(1, -1, i, -i)$
$c_{37} = 1/2(1, -i, 1, -i)$, $c_{38} = 1/2(1, i, 1, i)$, $c_{39} = 1/2(1, i, i, 1)$, $c_{40} = 1/2(1, -i, -1, i)$
$c_{41} = 1/2(1, -i, -i, -1)$, $c_{42} = 1/2(1, i, -i, 1)$, $c_{43} = 1/2(1, -i, -i, 1)$, $c_{44} = 1/2(1, i, i, -1)$
$c_{45} = 1/2(1, -i, -i, 1)$, $c_{46} = 1/2(1, i, 1, -1)$, $c_{47} = 1/2(1, -i, -i, -1)$, $c_{48} = 1/2(1, i, i, 1)$
$c_{49} = 1/2(1, -i, i, 1)$, $c_{50} = 1/2(1, i, 1, 1)$, $c_{51} = 1/2(1, -i, -1, 1)$, $c_{52} = 1/2(1, i, -1, -1)$
$c_{53} = 1/2(1, 1, 1, -1)$, $c_{54} = 1/2(1, -1, -1, -1)$, $c_{55} = 1/2(1, 1, -1, 1)$, $c_{56} = 1/2(1, -1, 1, -1)$
$c_{57} = 1/2(1, 1, -i, i)$, $c_{58} = 1/2(1, 1, i, -i)$, $c_{59} = 1/2(1, -1, -i, -i)$, $c_{60} = 1/2(1, -1, i, i)$

COMPLEX VECTOR QUANTIZATION CODEBOOK FOR USE IN DOWNLINK MULTI-USER MIMO MOBILE BROADCAST SYSTEMS

FIELD OF THE INVENTION

The present invention relates generally to the field of wireless communications systems using downlink multi-user MIMO (multiple-input-multiple-output) mobile broadcast with feedback, and more particularly to a complex vector quantization codebook for use in such systems.

BACKGROUND OF THE INVENTION

Quantizers of complex vectors find numerous applications in modern communication systems. One typical example is downlink multi-user MIMO (multiple-input-multiple-output) mobile broadcast systems with feedback. As is well known to those skilled in the art, MIMO broadcast systems with feedback are organized as follows. The mobile base station is assumed to be equipped with M transmitting antennas, and it needs to transmit independent messages to K wireless (i.e., mobile) terminals (i.e., receivers). Each of these K terminals is typically equipped with a single antenna. In particular, the base station transmits signal $x_j \in C$ from the j-th antenna, where C is the set of all complex numbers. Thus, the base station transmits a vector $x_j = (x_1, \ldots, x_M) \in C^M$ from the j-th antenna.

During transmission from the j-th antenna to the m-th mobile terminal the signal $x_j$ is multiplied by a channel coefficient $h_{m,j}$. (As is well known to those of ordinary skill in the art, the channel coefficient of a mobile communications channel represents the effect of the environment on the transmitted signal. As such, it is likely that the channel coefficient of a given channel varies over time.) Thus, when the vector x is transmitted by the base station, the terminal m actually receives the signal $y_m = h_m x^* + z_m$, where $h_m = (h_{m,1}, \ldots, h_{m,M}) \in C^M$ is the channel vector of the m-th mobile terminal and $z_m$ is additive noise. (Note that by convention, we will denote by boldface letters row vectors, and by the operator "*" transposition and complex conjugation of complex vectors.) Note that the power of the transmitted vector x cannot exceed P, i.e., $E[\|x^2\|] \leq P$.

As is well known to those skilled in the art, at the beginning of each communication session (and periodically during it), the base station sends fixed, well-defined pilot signals to the mobile terminals. The mobile terminals use these pilot signals to estimate their respective channel vectors $h_m$. Next, the m-th mobile terminal (m=1, ..., K) decodes its channel vector $h_m$, typically by using a predefined codebook (which is fixed and known to each of the mobile terminals and also to the base station), $C = \{c_1, c_2, \ldots, c_r\}$, $c_i \in C^M$, $\|c_i\| = 1$, where each of the r codebook entries comprises an M-element complex vector, which is advantageously used to represent (i.e., by approximating) the actual (i.e., as measured) value of the channel vector. In particular, the m-th mobile terminal computes $$t_m = \arg\max_{c_i \in C} |h_m c_i^*|^2.$$

That is, the code vector $t_m$ is the index of the codebook entry within the codebook which best represents the channel vector $h_m$, and thus, the code vector $t_m$ is a "quantized" (i.e., approximated) version of the channel vector $h_m$. Typically, the codebooks used in such wireless communications systems comprise code vectors which have been generated randomly.

After the m-th mobile terminal has selected a codebook entry to represent its channel vector, it transmits the index thereof, $t_m$, back to the base station, thereby indicating to the base station the (approximate) value of the channel vector $h_m$. That is, since the codebook used by the mobile terminals is fixed and is also known by the base station, the indices $t_m$, m=1, ..., K advantageously allow the base station to reconstruct the quantized versions $c_{t_1}, \ldots, c_{t_K}$ of the channel vectors $h_1, \ldots, h_K$, respectively. A base station employing downlink multi-user MIMO broadcast techniques then must choose a subset of M mobile terminals from among the K mobile terminals (since the base station has only M antennae and thus can transmit at most M independent sets of data); and then it must transmit the appropriate data to those M mobile terminals, preferably taking the (reconstructed) channel vectors into account (since these channel vectors will otherwise distort the transmitted data).

Although there are various strategies that can be used by the base station for choosing the subset of M mobile terminals and for transmitting the associated data thereto, all such prior art approaches invariably result in the frequent transmission of data to the M mobile terminals which interfere with each other. For example, one such strategy which provides some efficiency improvement involves the base station performing a search amongst the various channel vectors in an attempt to find among the code vectors $c_{t_1}, \ldots, c_{t_K}$, M vectors that are mutually (i.e., pairwise) orthogonal or almost orthogonal to each other, that is to find a subset $B \subseteq \{t_1, \ldots, t_K\}$ such that for any i, j∈B we have $|c_i c_j^*|^2 = 0$ (i.e., $c_i$ and $c_j$ are orthogonal) or $|c_i c_j^*|^2 \leq \alpha$ (i.e., $c_i$ and $c_j$ are almost orthogonal), where $\alpha$ is a small constant (for example, 0.05) that does not depend on i or j. To the extent that such code vectors can be found, the amount of interference will be advantageously reduced by selecting mobile terminals m∈B, since channel vectors of these mobile terminals are almost orthogonal to each other and therefore they introduce only small interference to each other. However, such an approach is "hit or miss" at best, and, in many, if not most, cases, no such set of M vectors will be found (given a reasonable value of $\alpha$, of course). What is needed is an approach whereby the interference between the data simultaneously sent by the base station to a plurality of mobile terminals is reliably minimized much, if not most, of the time.

SUMMARY OF THE INVENTION

The present invention provides wireless communications devices having a novel complex vector quantization codebook for use in a downlink multi-user MIMO (multiple-input-multiple-output) mobile broadcast system with feedback which, in accordance with various illustrative embodiments thereof, advantageously enables the interference between the data simultaneously sent by the base station to a plurality of mobile terminals to be reliably minimized. Specifically, the inventor has recognized that it is possible to devise a complex vector quantization codebook such that it contains many subsets of code vectors that are mutually (i.e., pairwise) orthogonal or almost orthogonal to each other—that is, subsets of code vectors for which each pair of code vectors, $c_i$ and $c_j$ included therein, $|c_i c_j^*|^2 = 0$ (i.e., $c_i$ and $c_j$ are orthogonal) or $|c_i c_j^*|^2 \leq \alpha$ (i.e., $c_i$ and $c_j$ are almost orthogonal), where $\alpha$ is a small constant (illustratively, 0.05). With use of such a codebook, the base station is advantageously able to transmit simultaneously to subsets of mobile terminals associated with these subsets of code vectors with minimal interference therebetween.

More specifically, in accordance with one illustrative embodiment of the present invention, a wireless communications device having a complex vector quantization codebook is provided for use in a downlink multi-user MIMO mobile broadcast system with feedback, wherein the codebook comprises r entries, each entry comprising M elements, and wherein the number of distinct subsets of M codebook entries that are substantially mutually (i.e., pairwise) orthogonal to each other exceeds, by at least twenty percent, the statistically expected number of distinct subsets of M codebook entries that would be substantially mutually (i.e., pairwise) orthogonal to each other in a randomly generated codebook of r entries, with each such entry comprising M elements. As used herein, subsets of codebook entries are substantially mutually orthogonal to each other if, for each pair of codebook entries, $c_i$ and $c_j$ ($i \neq j$), in the subset, either $|c_i c^*_j|^2 = 0$ (i.e., $c_i$ and $c_j$ are orthogonal) or $|c_i c^*_j|^2 \geq \alpha$ (i.e., $c_i$ and $c_j$ are almost orthogonal), where $\alpha$ is a small constant (illustratively, 0.05).

In accordance with another illustrative embodiment of the present invention, a wireless communications device having a complex vector quantization codebook is provided for use in a downlink multi-user MIMO mobile broadcast system with feedback, wherein the codebook has been generated based on binary Reed-Muller codes and on Reed-Muller codes over $Z_4$. And in accordance with still another illustrative embodiment of the present invention, a method of operating a wireless communications device in a downlink multi-user MIMO mobile broadcast system with feedback is provided, the wireless communications device having a complex vector quantization codebook, wherein the method comprises the steps of receiving a plurality of codebook indices from a corresponding plurality of terminals, the plurality of codebook indices representing a corresponding plurality of codebook entries, and matching one or more subsets of M of said plurality of codebook entries to one or more predetermined subsets of M of the codebook entries in the codebook, wherein the codebook entries comprised in each of said predetermined subsets of M of the codebook entries are substantially mutually (i.e., pairwise) orthogonal to each other.

BRIEF DESCRIPTION OF THE DRAWINGS

FIG. 2 shows a flowchart of an illustrative procedure for generating a complex vector quantization codebook in accordance with one illustrative embodiment of the present invention.

FIG. 3 shows an illustrative complex vector quantization codebook in accordance with one illustrative embodiment of the present invention, the codebook having been generated by the illustrative procedure of FIG. 2 and for use in the sample wireless communications system of FIG. 1.

DETAILED DESCRIPTION OF THE PREFERRED EMBODIMENTS

A Sample Wireless Communications System

Figure 1:
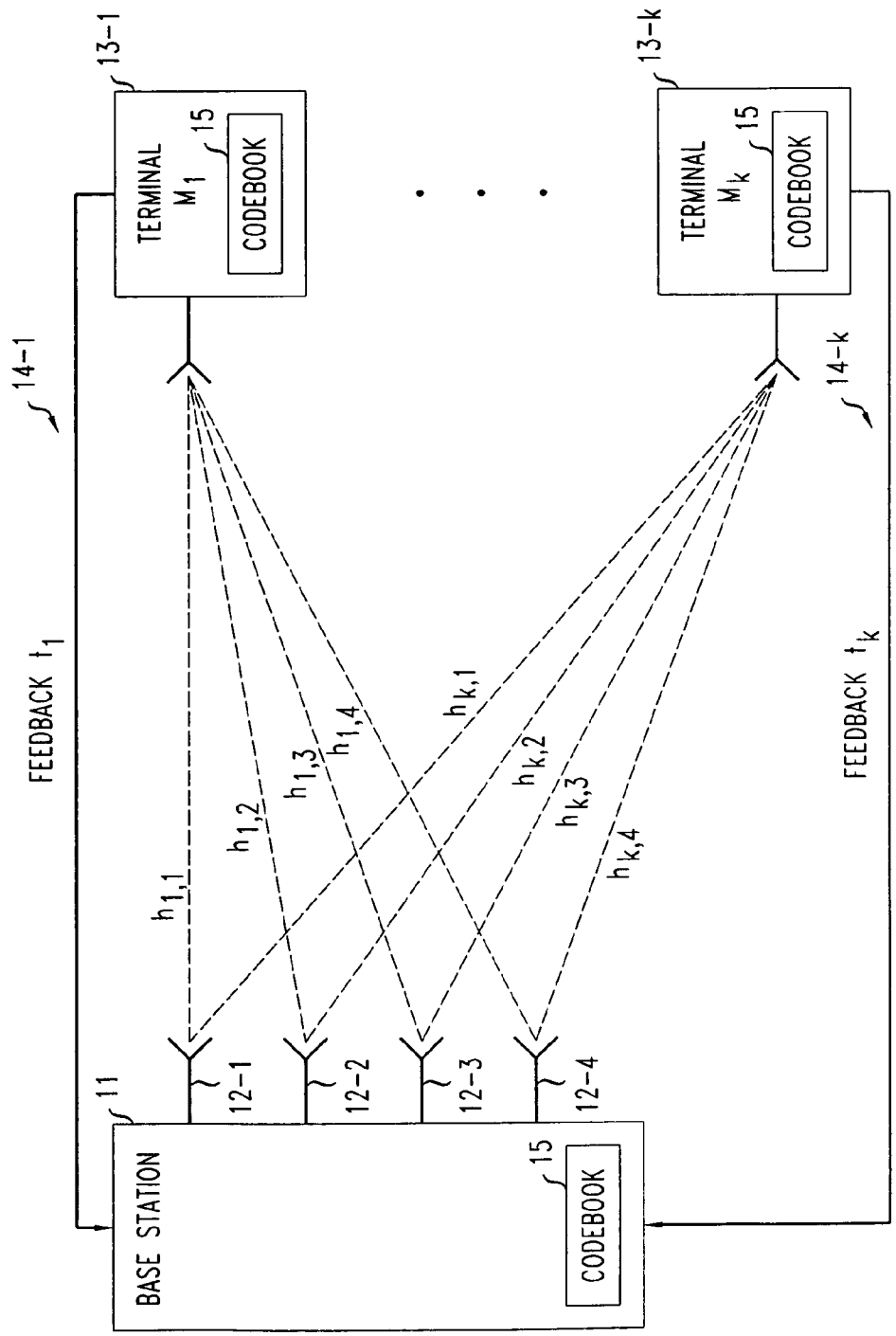
FIG. 1 shows a sample wireless communications system using downlink multi-user MIMO mobile broadcast with feedback, in which an illustrative codebook in accordance with an illustrative embodiment of the present invention is advantageously employed.

FIG. 1 shows a sample wireless communications system using downlink multi-user MIMO mobile broadcast with feedback, in which an illustrative codebook in accordance with an illustrative embodiment of the present invention is advantageously employed. The sample system of FIG. 1 comprises base station 11 having M=4 antennas 12-1 through 12-4, as well as K (single antenna) wireless terminals 13-1 through 13-K. Each wireless terminal has a corresponding feedback communications path 14-1 through 14-K (labeled as $t_1$ through $t_K$, respectively) back to base station 11. Moreover, associated with each wireless terminal 13-1 through 13-K is a set of 4 (since, illustratively, M=4 in the system of FIG. 1) corresponding channel coefficients $h_{1,1}$, $h_{1,2}$, $h_{1,3}$ and $h_{1,4}$ through $h_{K,1}$, $h_{K,2}$, $h_{K,3}$ and $h_{K,4}$, respectively.

Base station 11 of the sample wireless communications system of FIG. 1, as well as each of wireless terminals 13-1 through 13-K, each advantageously includes an identical codebook 15, whose code vectors are advantageously defined in accordance with an illustrative embodiment of the present invention (see, e.g., the illustrative codebook shown in FIG. 3). In particular, codebook 15 advantageously comprises a large number of distinct subsets of 4 (i.e., since M=4 in the sample wireless communications system of FIG. 1) code vectors that are mutually (i.e., pairwise) orthogonal or almost orthogonal to each other—that is, subsets of 4 code vectors for which each pair of code vectors, $c_i$ and $c_j$, included therein, $|c_i c^*_j|^2 = 0$ (i.e., $c_i$ and $c_j$ are orthogonal) or $|c_i c^*_j|^2 \geq \alpha$ (i.e., $c_i$ and $c_j$ are almost orthogonal), where $\alpha$ is a small constant (illustratively, 0.05).

In accordance with the principles of the present invention, codebook 15 of the sample wireless communications system of FIG. 1 may be constructed using the following generalized procedure. In particular, we illustratively and advantageously construct a codebook for use in a downlink multi-user MIMO mobile broadcast system, wherein the base station is equipped with M=$2^m$ antennas. In general, as will be obvious to those skilled in the art, the following procedure may be employed where m is any nonnegative integer to generate a codebook for use with a base station equipped with M=$2^m$ antennas. (For example, in the sample wireless communications system of FIG. 1, m=2, since M=4.) Specifically, the following construction is based on two well-known families of error correcting codes, each fully familiar to those of ordinary skill in the art—namely binary Reed-Muller codes and Reed-Muller codes over $Z_4$. Below we review the definitions of these well-known codes.

Binary Reed-Muller Codes

The following definition of the binary Reed-Muller codes RM(r,m) is well-known. First we define the component-wise product of binary vectors a=($a_1$, $a_2$, . . . , $a_n$) and b=($b_1$, $b_2$, . . . , $b_n$) by ab=($a_1 b_1$, $a_2 b_2$, . . . , $a_n b_n$). Let $G_0$ be the 1 by $2^m$ matrix equal to the all-one vector of length n=$2^m$. Let $G_1$ be the m by $2^m$ matrix composed from all binary m-tuples ordered in increasing order. Let $G_t$ be a $$\binom{m}{t} \text{ by } 2^m$$

matrix whose rows are obtained by the component-wise multiplication of each possible choice of t rows of $G_1$. A generator matrix of RM(r,m) is defined by $$G(RM(r,m)) = \begin{bmatrix} G_0 \\ G_1 \\ \vdots \\ G_r \end{bmatrix}$$

For example if m=3 (i.e., M=8) and r=2, the matrices $G_0$, $G_1$, $G_2$ are $$G_0 = [1\ 1\ 1\ 1\ 1\ 1\ 1\ 1]$$

$$G_1 = \begin{bmatrix} 11111111 \\ 01010101 \\ 00110011 \\ 00001111 \end{bmatrix}$$

$$G_2 = \begin{bmatrix} 11111111 \\ 01010101 \\ 00110011 \\ 00001111 \\ 00010001 \\ 00000101 \\ 00000011 \end{bmatrix}$$

The minimum weight of RM(r,m) is $d=2^{m-r}$. The number of code vectors of the weight of RM(r,m) is equal to $$A_{r,m} = 2^r \prod_{i=0}^{m-r-1} 2^{m-i}/(2^{m-r-i}-1)$$

Reed-Muller Codes Over $Z_4$

It is well-known to those skilled in the art that, with use of an appropriate combination of pairs of bits, second order binary Reed-Muller codes RM(2,m) can be represented as a linear code over $Z_4$ of length $2^{m-1}$, denoted by ZRM(2,m-1). Let $(v_1, \ldots, v_m)$ range over $F_2^m$. ZRM(2,m) is generated by $1, v_1, \ldots, v_m, 2v_1v_2, \ldots, 2v_{m-1}v_m$. For example, $$G(ZRM(2,2)) = \begin{bmatrix} 1111 \\ 0101 \\ 0011 \\ 0002 \end{bmatrix} \begin{matrix} 1 \\ v_1 \\ v_2 \\ v_1v_2 \end{matrix}$$

Let G(ZRM*(2,m)) be the matrix obtained from G(ZRM(2,m)) by removing the first row, which is the all-one vector. Denote the code with such generator matrix by ZRM*(2,m). For m=0 and m=1 codes ZRM*(2,m) are defined explicitly as $$ZRM^*(2,0)=\{(0)\} \text{ and}$$

$$ZRM^*(2,1)=\{(0,0),(0,1),(0,2),(0,3)\}.$$

Now define the map $$\psi((v_1, \ldots, v_m))=(i^{v_1}, \ldots, i^{v_n}), v_j \in Z_4, i=\sqrt{-1}.$$

For example, $\psi((0,1,0,1))=(1,i,1,i)$. Now define complex codebooks $$CRM(2,m)=\{\psi((v_1, \ldots, v_n)):$$
$$(v_1, \ldots, v_n) \in ZRM^*(2,m)\}.$$

Note that from the above definitions of codes ZRM*(2,0) and ZRM*(2,1), it follows that $$CRM(2,0)=\{(1)\} \text{ and}$$

$$CRM(2,1)=\{(1,1),(1,i),(1,-1),(1,-i)\}.$$

Note also that the number of code vectors of CRM(2,m) is equal to $$|CRM(2,m)| = 2^{2m+\binom{m}{2}}.$$

Construction of Quantization Codebooks G-ZRM(r,m)

In accordance with an illustrative embodiment of the present invention, illustrative codebooks may be advantageously generated based on binary Reed-Muller codes and Reed-Muller codes over $Z_4$, as defined and described above. In particular, we construct illustrative codebooks G-ZRM(r, m). Codebook G-ZRM(r,m) as defined herein may be advantageously used in a wireless communications system using downlink multi-user MIMO mobile broadcast with feedback, given that the base station thereof is equipped with M=$2^m$ antennas. Codebooks G-ZRM(r,m) advantageously provide good quantization of channel vectors and, in accordance with the principles of the present invention, have the important property that many sets of their code vectors are mutually (i.e., pairwise) orthogonal or almost orthogonal.

FIG. 2 shows a flow diagram of an illustrative procedure for generating a complex vector quantization codebook in accordance with one illustrative embodiment of the present invention. In particular, the illustrative construction proceeds as follows:

1. For r from m to 0 (by −1), repeat steps 2 and 3 below. (See blocks 21, 24 and 25 of the flowchart of FIG. 2.)

2. Form the set V of code vectors of the minimum weight of the code RM(r,m). (See block 22 of the flowchart of FIG. 2.)

3. For each vector v∈V and each vector w∈CRM(2,m−r) form the vector $c_{v,w}$ by replacing nonzero entries of v with corresponding entries of w. (See block 23 of the flowchart of FIG. 2.)

4. Finally, the code vectors of the generated codebook are obtained by normalizing the vectors $c_{v,w}$ such that each code vector would have norm 1. (See block 26 of the flowchart of FIG. 2.)

To clarify this definition let us consider the following example, where m=2 (i.e., where the number of antennae M=4):

1. First, let r=2. The set of minimum weight code vectors of RM(2,2) is
V={(1,0,0,0),(0,1,0,0),(0,0,1,0),(0,0,0,1)} and CRM(2,0)= {(1)}. Hence the code vectors $c_{v,w}$ are {(1,0,0,0),(0,1,0,0),(0,0,1,0),(0,0,0,1)}.

2. Then, let r=1. The set of minimum weight code vectors of RM(1,2) is V={(1,1,0,0),(1,0,1,0),(1,0,0,1),(0,1,1,0),(0,1,0,1),(0,0,1,1)} and CRM(2,1)={(1,1),(1,i),(1,−1),(1,−i)}. Hence the code vectors $c_{v,w}$ are
(1,1,0,0),(1,i,0,0),(1,−1,0,0),(1,−i,0,0)
(1,0,1,0),(1,0,i,0),(1,0,−1,0),(0,1,0,−i)
(1,0,0,1),(1,0,0,i),(1,0,0,−1),(1,0,0,−i)
(0,1,1,0),(0,1,i,0),(0,1,−1,0),(0,1,−i,0)
(0,1,0,1),(0,1,0,i),(0,1,0,−1),(1,0,−i,0)
(0,0,1,1),(0,0,1,i),(0,0,−1,1),(0,0,1,−i)

3. Finally, let r=0. The set of minimum weight code vectors of RM(0,2) is V={(1,1,1,1)} and code vectors of CRM(2,2) can be generated with the help of the generator matrix G(ZRM(2,2)), as defined above. Since the set V contains only one vector (1,1,1,1), the code vectors $c_{v,w}$ coincide with w∈CRM(2,2), which are listed below:

(1,1,1,1), (1,−1, 1,−1), (1, 1,−1,−1), (1,−1,−1, 1),
(1, 1,−i,−i), (1,−1,−i, i), (1,1, i, i), (1,−1, i,−i),
(1,−i, 1,−i), (1, i, 1, i), (1,−i,−1, i), (1, i,−1,−i),
(1,−i,−i,−1), (1, i,−i, 1), (1, i, i,−1), (1, i, i,−1),
(1,−i,−i, 1), (1, i,−i,−1), (1,−i, i,−1),(1, i, i, 1),
(1,−i, 1, i), (1, i, 1,−i), (1,−i,−1,−i), (1, i,−1, i), (1, 1, 1,−1), (1,−1, 1, 1), (1, 1,−1, 1), (1,−1,−1,−1),
(1, 1,−i, i), (1,−1,−i,−i), (1, 1, i,−i), (1,−1, i, i).

Note that the number of code vectors of G-ZRM(r,m) is equal to $$|G-ZRM(m)| = \sum_{0}^{m} A_{r,m}|CRM(2, m-r)|$$

where $A_{r,m}$ and $|CRM(2,m-r)|$ are defined above. For example, for m=2, 3 and 4, we will have |G-ZRM(m)|=60, 1080 and 36720, respectively. Since it is often convenient that the size of a codebook be equal to a power of two, in accordance with certain illustrative embodiments of the present invention, several random vectors may be added or removed from G-ZRM(m) as necessary to adjust its size to be a power of two. For example, by adding four random vectors of norm 1 to G-RM(2) we obtain a codebook of size 64 ($2^6$). Similarly, by removing some randomly selected vectors from the G-ZRM(3) and from the G-ZRM(4) codebooks, we can obtain codebooks of sizes 1024 ($2^{10}$) and $2^{15}$, respectively.

An Illustrative Codebook in Accordance with the Present Invention

FIG. 3 shows an illustrative complex vector quantization codebook in accordance with one illustrative embodiment of the present invention, the codebook having been generated by the illustrative procedure of FIG. 2 as described above, and the codebook for use in the sample wireless communications system of FIG. 1. In particular, this codebook comprises the codebook G-ZRM(2) as defined above. Note that, in accordance with the principles of the present invention, the illustrative codebook of FIG. 3, as well as other codebooks generated with use of the illustrative procedure of FIG. 2 described herein, advantageously comprises a very large number of subsets of orthogonal or almost orthogonal vectors.

In particular, it is not difficult to verify that the following 105 subsets of code vectors of the illustrative codebook of FIG. 3 form orthonormal bases (i.e., subsets of mutually orthogonal code vectors). (For simplicity, only the indices of the code vectors are listed below. So, for example, {1, 2, 25, 27} as shown below actually means the set of code vectors $\{c_1, c_2, c_{25}, c_{27}\}$.):

{1, 2, 3, 4},{1, 2, 25, 27},{1, 2, 26, 28},{1, 3, 12, 22},
{1, 3, 21, 23},{1, 4, 17, 19},{1, 4, 18, 20},{2, 3, 13, 15},
{2, 3, 14, 16},{2, 4, 9, 11},{2, 4, 10, 24},{3, 4, 5, 7},
{3, 4, 6, 8},{5, 7, 25, 27},{5, 7, 26, 28},{5, 25, 30, 32},
{5, 25, 34, 36},{5, 27, 54, 56},{5, 27, 58, 60},{6, 8, 25, 27},
{6, 8, 26, 28},{6, 26, 37, 39},{6, 26, 41, 43},{6, 28, 45, 47},
{6, 28, 49, 51},{7, 25, 53, 55},{7, 25, 57, 59},{7, 27, 29, 31},
{7, 27, 33, 35},{8, 26, 46, 48},{8, 26, 50, 52},{8, 28, 38, 40},
{8, 28, 42, 44},{9, 11, 12, 22},{9, 11, 21, 23},{9, 21, 31, 32},
{9, 21, 39, 40},{9, 23, 51, 52},{9, 23, 55, 56},{10, 12, 22, 24},
{10, 12, 45, 46},{10, 12, 57, 58},{10, 21, 23, 24},{10, 22, 33, 34},
{10, 22, 41, 42},{11, 21, 49, 50},{11, 21, 53, 54},{11, 23, 29, 30},
{11, 23, 37, 38},{12, 24, 35, 36},{12, 24, 43, 44},{13, 15, 17, 19},
{13, 15, 18, 20},{13, 17, 30, 31},{13, 17, 46, 47},{13, 19, 41, 44},
{13, 19, 53, 56},{14, 16, 17, 19},{14, 16, 18, 20},{14, 18, 33, 36},
{14, 18, 50, 51},{14, 20, 37, 40},{14, 20, 58, 59},{15, 17, 42, 43},
{15, 17, 54, 55},{15, 19, 29, 32},{15, 19, 45, 48},{16, 18, 38, 39},
{16, 18, 57, 60},{16, 20, 34, 35},{16, 20, 49, 52},{22, 24, 47, 48},
{22, 24, 59, 60},{29, 30, 31, 32},{29, 30, 39, 40},{29, 31, 34, 36},
{29, 32, 46, 47},{30, 31, 45, 48},{30, 32, 33, 35},{31, 32, 37, 38},
{33, 34, 35, 36},{33, 34, 43, 44},{33, 36, 49, 52},{34, 35, 50, 51},
{35, 36, 41, 42},{37, 38, 39, 40},{37, 39, 42, 44},{37, 40, 57, 60},
{38, 39, 58, 59},{38, 40, 41, 43},{41, 42, 43, 44},{41, 44, 54, 55},
{42, 43, 53, 56},{45, 46, 47, 48},{45, 46, 59, 60},{45, 47, 50, 52},
{46, 48, 49, 51},{47, 48, 57, 58},{49, 50, 51, 52},{49, 50, 55, 56},
{51, 52, 53, 54},{53, 54, 55, 56},{53, 55, 58, 60},{54, 56, 57, 59},{57, 58, 59, 60}.

Moreover, we will say that two code vectors c and w are "almost orthogonal" if $|vw^*|^2=\alpha$, where $\alpha$ is a small constant (illustratively, 0.05). In accordance with the principles of the present invention, subsets of code vectors may be considered to be substantially mutually orthogonal if they are either orthogonal or almost orthogonal, as herein defined.

Note that, in addition to having many subsets of code vectors that are mutually (pairwise) orthogonal, codebooks G-ZRM(m), as generated in accordance with the illustrative procedure of FIG. 2 described above, also advantageously have many subsets of code vectors that are "1/M-orthogonal," in that the square of the absolute values of their inner product is equal to 1/M. (Two code vectors c and w are defined herein to be "1/M-orthogonal" if $|vw^*|^2=1/M$, where M is the number of antennae, $2^m$). By way of example, the following five code vectors (among many others) of G-ZRM(2), the illustrative codebook shown in FIG. 3, are 1/M-orthogonal:
$c_1$=(1,0,0,0), $c_{29}$=1/2(1,1,1,1), $c_{41}$=(0,0,1,0),
$c_{49}$=1/2(1,−i, 1,i), $c_{57}$=1/2(1,1,−i,i)

It is easy to see, for example, that the code vector c=(1,0,0,0) is 1/M-orthogonal to any of a number of code vectors, including, $c_j$, j=29, . . . , 57. In a similar way one can find many other 1/M-orthogonal code vectors for any given code vector c in the codebook of FIG. 3. Note that as M (i.e., the number of transmitting antennae) grows, 1/M-orthogonal code vectors become closer to being orthogonal (since 1/M becomes smaller).

An Illustrative Base Station in Accordance with the Present Invention

To demonstrate the advantage of having many substantially orthogonal or 1/M-orthogonal subsets of code vectors, let us again consider, for example, the case where m=2 (i.e., where the base station comprises M=4 antennae.) Let $c_1, \ldots, c_{t_k}$ be the quantized versions of the channel vectors of the mobile terminals 1, . . . , K, respectively. These code vectors are available to the base station and the base station needs to decide to which four of the K mobile terminals it is to simultaneously transmit data. In accordance with an illustrative embodiment of the present invention, the following algorithm may be advantageously employed by the base station (assuming that the illustrative codebook of FIG. 3 in accordance with the principles of the present invention is being used):

The base station advantageously checks whether any of the known 105 subsets of code vectors that form orthonormal bases belong to the set $\{t_1, \ldots, t_k\}$. If the base station finds such a matching subset (for example, $t_3$=1, $t_{10}$=2, $t_{13}$=25, $t_{19}$=27, which is the second orthonormal basis in the list of 105 orthonormal bases enumerated above), it advantageously transmits to the set of mobile terminals associated with this subset (in this example, to mobile terminals 3, 10, 13 and 19). If, on the other hand, the base station does not find such a subset than it identifies a set, S, which has the largest possible intersection with the set $\{t_1, \ldots, t_k\}$ (for example, if $t_3=1$, $t_{10}=2$, $t_{13}=25$, this would result in the set S=$\{3, 10, 13\}$). Next the base station attempts to find M−|S| code vectors that are 1/M-orthogonal to the code vectors $c_1$, i∈S, and it adds these 1/M-orthogonal code vectors to the set. For example, the code vector $c_{37}$ is 1/M-orthogonal to $c_1, c_2, c_{25}$.

Thus, the base station is able to simultaneously transmit data to a subset of mobile terminals for which their corresponding channel vectors are mutually orthogonal or, at least, 1/M-orthogonal. Since, as is well known to those of ordinary skill in the art, mobile terminals having orthogonal or almost orthogonal channel vectors do not produce a strong interference between each other's data signals, concurrent transmission to such mobile terminals advantageously allows illustrative wireless communications systems in accordance with the principles of the present invention to reliably achieve a high performance.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

What is claimed is:

1. A wireless communication device comprising a complex vector quantization codebook for use in a downlink multi-user MIMO mobile broadcast system with feedback, the codebook comprising r entries, each entry comprising M elements, the codebook comprising at least X distinct subsets of M of said r codebook entries that are substantially mutually orthogonal, wherein X is at least twenty percent more than a statistically expected number of distinct subsets of M codebook entries that would be substantially mutually orthogonal to each other in a randomly generated codebook of r entries, each such entry comprising M elements.

2. The wireless communication device of claim 1 wherein said at least X distinct subsets of M of said r codebook entries comprised in the codebook are mutually orthogonal in that for each of said at least X distinct subsets of M of said r codebook entries comprised in the codebook, for each pair of distinct code vectors, $c_i$ and $c_j$, comprised in said subset of codebook entries, $|c_i c^*_j|^2 = 0$.

3. The wireless communication device of claim 1 wherein, for each of said at least X distinct subsets of M of said r codebook entries comprised in the codebook, for each pair of distinct code vectors, $c_i$ and $c_j$, comprised in said subset of codebook entries, $|c_i c^*_j|^2 \geq \alpha$, where $\alpha=0.05$.

4. The wireless communication device of claim 1 wherein the wireless communication device comprises a mobile terminal.

5. The wireless communication device of claim 4 wherein the mobile terminal uses said codebook to approximate a channel vector associated therewith.

6. The wireless communication device of claim 5 wherein the mobile terminal receives a pilot signal from a base station having at least M antennae, estimates the channel vector associated with the mobile terminal therefrom, decodes said channel vector estimate with use of the codebook to select a best-matching codebook entry thereof, thereby approximating said channel vector with said selected codebook entry, and communicates an index of said selected codebook entry back to the base station.

7. The wireless communication device of claim 1 wherein the wireless communication device comprises a base station having at least M antennae.

8. The wireless communication device of claim 7 wherein the base station uses said codebook to approximate channel vectors associated with each of a plurality of mobile terminals.

9. The wireless communication device of claim 8 wherein the base station receives a corresponding code vector index from each of said plurality of mobile terminals, identifies a subset of M of said plurality of mobile terminals for which said corresponding code vector indices represent code words that are substantially mutually orthogonal, and simultaneously transmits data to each of said M mobile terminals in said identified subset of M of mobile terminals.

10. The wireless communication device of claim 1 wherein the codebook has been generated based on binary Reed-Muller codes and on Reed-Muller codes over $Z_4$.

11. The wireless communication device of claim 10 wherein said codebook as generated based on binary Reed-Muller codes and on Reed-Muller codes over $Z_4$ has been modified by the addition of one or more random code vectors thereto, such that the number of entries, r, comprised in said codebook is a power of two.

12. The wireless communication device of claim 10 wherein said codebook as generated based on binary Reed-Muller codes and on Reed-Muller codes over $Z_4$ has been modified by the removal of one or more code vectors therefrom, such that the number of entries, r, comprised in said codebook is a power of two.

13. The wireless communication device of claim 1 wherein the codebook comprises the following 60 code vectors: $c_1=(1, 0, 0, 0)$, $c_2=(0, 1, 0, 0)$, $c_3=(0, 0, 1, 0)$, $c_4=(0, 0, 0, 1)$ $c_5=1/\sqrt{2}(1, 1, 0, 0)$, $c_6=1/\sqrt{2}(1, i, 0, 0)$, $c_7=1/\sqrt{2}(1, -1, 0, 0)$, $c_8=1/\sqrt{2}(1, -i, 0, 0)$ $c_9=1/\sqrt{2}(1, 0, 1, 0)$, $c_{10}=1/\sqrt{2}(1, 0, i, 0)$, $c_{11}=1/\sqrt{2}(1, 0, -1, 0)$, $c_{12}=1/\sqrt{2}(0, 1, 0, -i)$ $c_{13}=1/\sqrt{2}(1, 0, 0, 1)$, $c_{14}=1/\sqrt{2}(1, 0, 0, i)$, $c_{15}=1/\sqrt{2}(1, 0, 0, -1)$, $c_{16}=1/\sqrt{2}(1, 0, 0, -i)$ $c_{17}=1/\sqrt{2}(0, 1, 1, 0)$, $c_{18}=1/\sqrt{2}(0, 1, i, 0)$, $c_{19}=1/\sqrt{2}(0, 1, -1, 0)$, $c_{20}=1/\sqrt{2}(0, 1, -i, 0)$ $c_{21}=1/\sqrt{2}(0, 1, 0, 1)$, $c_{22}=1/\sqrt{2}(0, 1, 0, i)$, $c_{23}=1/\sqrt{2}(0, 1, 0, -1)$, $c_{24}=1/\sqrt{2}(1, 0, -i, 0)$ $c_{25}=1/\sqrt{2}(0, 0, 1, 1)$, $c_{26}=1/\sqrt{2}(0, 0, 1, i)$, $c_{27}=1/\sqrt{2}(0, 0, -1, 1)$, $c_{28}=1/\sqrt{2}(0, 0, 1, -i)$ $c_{29}=1/2(1, 1, 1, 1)$, $c_{30}=1/2(1, -1, 1, -1)$, $c_{31}=1/2(1, 1, -1, -1)$, $c_{32}=1/2(1, -1, -1, 1)$ $c_{33}=1/2(1, 1, -i, -i)$, $c_{34}=1/2(1, -1, -i, i)$, $c_{35}=1/2(1, 1, i, i)$, $c_{36}=1/2(1, -1, i, -i)$ $c_{37}=1/2(1, -i, 1, -i)$, $c_{38}=1/2(1, i, 1, i)$, $c_{39}=1/2(1, -i, -1, i)$, $c_{40}=1/2(1, i, -1, -i)$ $c_{41}=1/2(1, -i, -i, -1)$, $c_{42}=1/2(1, i, -i, 1)$, $c_{43}=1/2(1, -i, i, 1)$, $c_{44}=1/2(1, i, i, -1)$ $c_{45}=1/2(1, -i, -i, 1)$, $c_{46}=1/2(1, i, -i, -1)$, $c_{47}=1/2(1, -i, i, -1)$, $c_{48}=1/2(1, i, i, 1)$ $c_{49}=1/2(1, -i, 1, i)$, $c_{50}=1/2(1, i, 1, -i)$, $c_{51}=1/2(1, -i, -1, -i)$, $c_{52}=1/2(1, i, -1, i)$ $c_{53}=1/2(1, 1, 1, -1)$, $c_{54}=1/2(1, -1, 1, 1)$, $c_{55}=1/2(1, 1, -1, 1)$, $c_{56}=1/2(1, -1, -1, -1)$ $c_{57}=1/2(1, 1, -i, i)$, $c_{58}=1/2(1, -1, -i, -i)$, $c_{59}=1/2(1, 1, i, -i)$, $c_{60}=1/2(1, -1, i, i)$.

14. A wireless communication device comprising a complex vector quantization codebook for use in a downlink multi-user MIMO mobile broadcast system with feedback, wherein the codebook has been generated based on both binary Reed-Muller codes and en Reed-Muller codes over $Z_4$.

15. A wireless communication device comprising a complex vector quantization codebook for use in a downlink multi-user MIMO mobile broadcast system with feedback, wherein the codebook has been generated based on binary Reed-Muller codes and on Reed-Muller codes over $Z_4$,
   wherein said codebook as generated based on binary Reed-Muller codes and on Reed-Muller codes over $Z_4$ has been modified by the addition of one or more random code vectors thereto, such that the number of entries comprised in said codebook is a power of two.

16. A wireless communication device comprising a complex vector quantization codebook for use in a downlink multi-user MIMO mobile broadcast system with feedback, wherein the codebook has been generated based on binary Reed-Muller codes and on Reed-Muller codes over $Z_4$,
   wherein said codebook as generated based on binary Reed-Muller codes and on Reed-Muller codes over $Z_4$ has been modified by the removal of one or more code vectors therefrom, such that the number of entries comprised in said codebook is a power of two.

17. A method of operating a wireless communication device comprising a complex vector quantization codebook for use in a downlink multi-user MIMO mobile broadcast system with feedback, the method comprising the steps of: receiving a plurality of codebook indices from a corresponding plurality of terminals, the plurality of codebook indices representing a corresponding plurality of codebook entries, each codebook entry comprising M elements, and matching (i) one or more subsets of M of said plurality of codebook entries represented by said conesponding plurality of said codebook indices to (ii) one or more predetermined subsets of M codebook entries of the codebook, wherein the codebook entries comprised in each of said predetermined subsets of M codebook entries are substantially mutually orthogonal.

18. The method of claim 17 wherein the wireless communication device comprises a base station having at least M antennae.

19. The method of claim 17 further comprising the step of simultaneously transmitting data to each of M terminals, the M terminals corresponding to those M terminals from which codebook indices representing codebook entries which have been matched to one of said predetermined subsets were received.

20. The method of claim 17 wherein the codebook has been generated based on binary Reed-Muller codes and on Reed-Muller codes over $Z_4$.

* * * * *